United States Patent
Morinaga et al.

(10) Patent No.: US 7,636,212 B2
(45) Date of Patent: Dec. 22, 2009

(54) MAGNETIC DISK DRIVE WITH CONTROL OF SENSE CURRENT OF MAGNETIC HEAD

(75) Inventors: Akira Morinaga, Kanagawa (JP); Hideki Zaitsu, Kanagawa (JP); Hiroshi Ide, Tokyo (JP); Hideo Tanabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 467 days.

(21) Appl. No.: 11/303,851

(22) Filed: Dec. 15, 2005

(65) Prior Publication Data

US 2006/0132963 A1 Jun. 22, 2006

(30) Foreign Application Priority Data

Dec. 17, 2004 (JP) .............................. 2004-365438

(51) Int. Cl.
*G11B 5/02* (2006.01)
*G11B 5/03* (2006.01)
(52) U.S. Cl. .......................................... 360/27; 360/66
(58) Field of Classification Search .................. 360/27, 360/66
See application file for complete search history.

(56) References Cited

U.S. PATENT DOCUMENTS 6,252,731 B1 *  6/2001  Sloan et al. .................... 360/31
6,262,858 B1 *  7/2001  Sugiyama et al. ............. 360/66
2005/0057835 A1 * 3/2005  Kim et al. ..................... 360/46

FOREIGN PATENT DOCUMENTS

| JP | 11-195211 | 7/1999 |
| JP | 2001-023106 | 1/2001 |
| JP | 2004-005852 | 1/2004 |

* cited by examiner

*Primary Examiner*—Daniell L Negrón
(74) *Attorney, Agent, or Firm*—Townsend and Townsend and Crew LLP; Rambod Nader

(57) ABSTRACT

An output of a magnetic head changes depending on the environmental temperature of a magnetic disk. In particular, under cold temperature conditions, an output of the head largely decreases mainly due to an increase in coercivity of a magnetic recording medium, which degrades an error rate. In one embodiment of the invention, sense-current optimization processing of a magnetic disk drive comprises the steps of: measuring the environmental temperature; and after a sense-current value which is set from the viewpoint of the reliability of the magnetic head is defined as an upper limit, finding out a sense current Is that can achieve the best error rate (BER) at the temperature. While changing a value of the sense current Is inside the magnetic disk drive, an error rate is measured. Then, a sense current Is_opt at which the best error rate properties are achieved is selected as a new set value.

12 Claims, 7 Drawing Sheets

MAGNETIC DISK DRIVE WITH CONTROL OF SENSE CURRENT OF MAGNETIC HEAD

CROSS-REFERENCES TO RELATED APPLICATIONS

This application claims priority from Japanese Patent Application No. JP2004-365438, filed Dec. 17, 2004, the entire disclosure of which is incorporated herein by reference.

BACKGROUND OF THE INVENTION

The present invention relates to a magnetic disk drive, and more particularly to a magnetic disk drive having a mechanism of controlling a sense current of a magnetic head.

Magnetic disk drives are indispensable in today's advanced information society as devices capable of recording a large amount of data, and are accordingly required to stably read/write data. A magnetic disk drive comprises: a magnetic recording medium (magnetic disk) to which data is written; a magnetic head for reading/writing data; a voice coil motor for moving the magnetic head; and other circuits. The magnetic head includes a write head for writing data, and a read head for reading data that is written to the magnetic disk. As an indicator for indicating read/write properties, there is an error rate. The error rate means a degree to which errors are included in read data, and shows that if a value of the error rate is small, the number of errors is small, which achieves good read/write properties. In general, in the SMART (Self Monitoring Analysis and Reporting Technology) function, which is a technology for improving the reliability of magnetic disk drives, there is a function of measuring an error rate, which makes it possible to measure an error rate in a magnetic disk drive.

Heretofore, magnetic disk drives are usually used for PC-related purposes, or used for large-scale storage systems such as RAID. However, their new uses are spreading these days. For example, car navigation systems, and portable terminals (cellular phones, and music terminals), are increasingly equipped with a magnetic disk drive taking advantage of the large storage capacity as well as the fast access speed. Reflecting the widespread uses, magnetic disk drives are required to operate in a temperature range that is wider than the currently used temperature range.

What is problematic here is in particular the performance of a magnetic disk drive at cold temperature. The coercivity of a magnetic disk increases as the environmental temperature decreases. Accordingly, writing becomes relatively difficult under the same write conditions, resulting in the degradation in read/write properties. With the object of preventing the degradation from occurring, as disclosed in patent document 1 (Japanese Patent Laid-Open No. 2004-5852), for example, what is proposed is the idea of aligning an overshoot electric current at the time of writing to optimize write conditions, and thereby improving read/write properties. However, with the increase in recording density of magnetic disk drives, the track width of a write head and that of a read head decrease. Therefore, if a decrease in output and the difficulty in positioning are taken into consideration, it is not easy to ensure the properties only by improving a write system.

In a magnetic disk drive, a sense current to flow through a read head is set at such a value that a desired element life is ensured at high temperature (for example, 70° C.). The element life is strongly dependent on an increase in temperature of an element. Accordingly, if the environmental temperature is low, a larger increase in temperature of the element is allowed, which makes it possible to further increase the sense current. From this point of view, what is considered as an effective method is to control the sense current so as to suppress the degradation in properties caused by a change in environmental temperature. As disclosed ideas relating to this, there are methods as follows: for example, as disclosed in patent document 2 (Japanese Patent Laid-Open No. Hei 11-195211), changing a sense current on the basis of a table predetermined in response to the temperature; as disclosed in patent document 3 (Japanese Patent Laid-Open No. 2001-23106), using the above-mentioned table, or controlling a sense current as a predetermined function of the resistance of an element and the temperature; or the like.

BRIEF SUMMARY OF THE INVENTION

A sense-current setting method capable of achieving the best read/write properties at an arbitrary environmental temperature cannot be realized only by the prior art described above. First of all, simply increasing the sense current causes both an output and a head noise to increase, which is a produced problem. Moreover, what is in particular problematic relating to narrow track read heads, which are recently used, is a nonlinear increase in input/output properties of a read head.

A feature of the present invention is to provide a magnetic disk capable of minimizing the degradation in error rate, and capable of stably operating at colder temperature.

According to one aspect of the present invention, there is provided a magnetic disk drive comprising: a magnetic disk for storing data a magnetic head including a magnetoresistive effect element, the magnetic head at least reading data on the magnetic disk; a temperature sensor for detecting the environmental temperature of the magnetic head; and a control unit for measuring an error rate from a read signal of the magnetic head. The control unit detects a change in environmental temperature from an output of the temperature sensor, and finds out such a sense current of the magnetoresistive effect element that the best error rate can be achieved, and then sets the sense current.

An upper limit of the sense current is a value that is determined from the viewpoint of the reliability of the magnetoresistive effect element. The upper limit of the sense current may also be a value that is determined from the viewpoint of the life of the magnetoresistive effect element. The timing of detecting the change in environmental temperature is at the time of powering on, at the time of loading the magnetic head, or at specific time intervals.

When the increase in environmental temperature is detected, the sense current is found out by repeatedly performing the steps of: measuring an error rate at the environmental temperature in question, said error rate being defined as an initial value; increasing the sense current by a specified value; making a check as to whether or not said increased sense current has exceeded the upper limit that is determined from the viewpoint of the reliability of the magnetoresistive effect element; if it is judged that the increased sense current has not exceeded the upper limit, setting the increased sense current as a new sense current; measuring an error rate for the new sense current; comparing the error rate for the new sense current with the error rate defined as the initial value; and if the error rate for the new sense current is smaller than the error rate defined as the initial value, setting the new sense current as an optimum value, and defining the error rate for the new current as the initial value.

According to another aspect of the present invention, there is provided a magnetic disk drive comprising: a magnetic disk for storing data; a magnetic head including a magnetoresistive effect element, the magnetic head at least reading data on the magnetic disk; and a control unit for measuring an error rate from a read signal of the magnetic head. If the degradation in error rate is detected, the control unit finds out such a sense current of the magnetoresistive effect element that the best error rate can be achieved, and then sets the sense current.

When the degradation in error rate is detected, the sense current is found out by repeatedly performing the steps of: increasing the sense current by a specified value; making a check as to whether or not the increased sense current has exceeded the upper limit that is determined from the viewpoint of the reliability of the magnetoresistive effect element; if it is judged that the increased sense current has not exceeded the upper limit, setting the increased sense current as a new sense current; measuring an error rate for the new sense current; comparing the error rate for the new sense current with the degraded error rate; and if the error rate for the new sense current is smaller than the degraded error rate, setting the new sense current as an optimum value, and defining the error rate for the new current as an initial value.

According to the present invention, it is possible to provide a magnetic disk capable of minimizing the degradation in error rate without degrading the life of a magnetic head, and capable of stably operating at colder temperature.

DETAILED DESCRIPTION OF THE INVENTION

Figure 4:
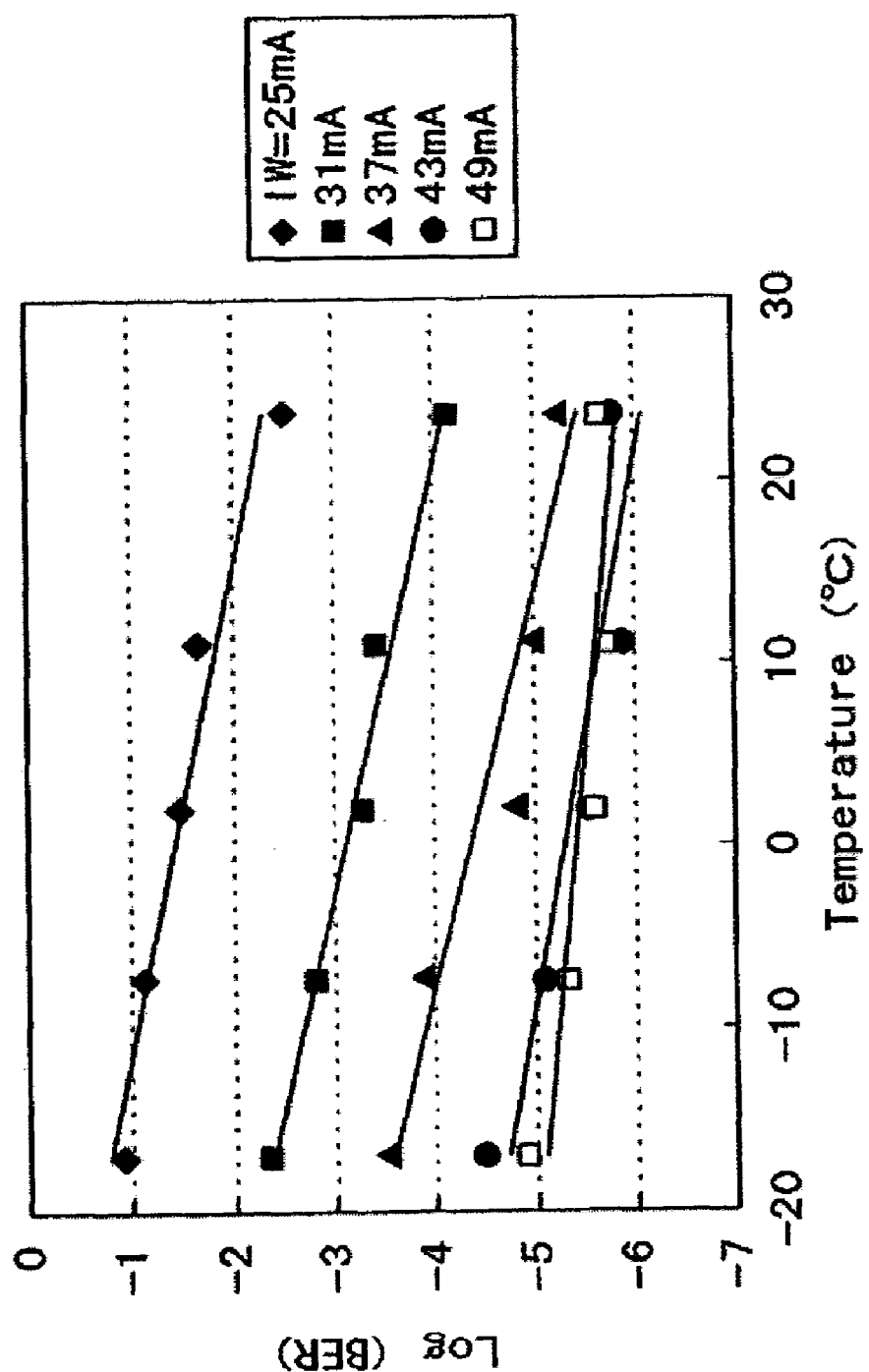
FIG. 4 is a graph illustrating a change in error rate when the environmental temperature and a write current are changed.
Figure 5:
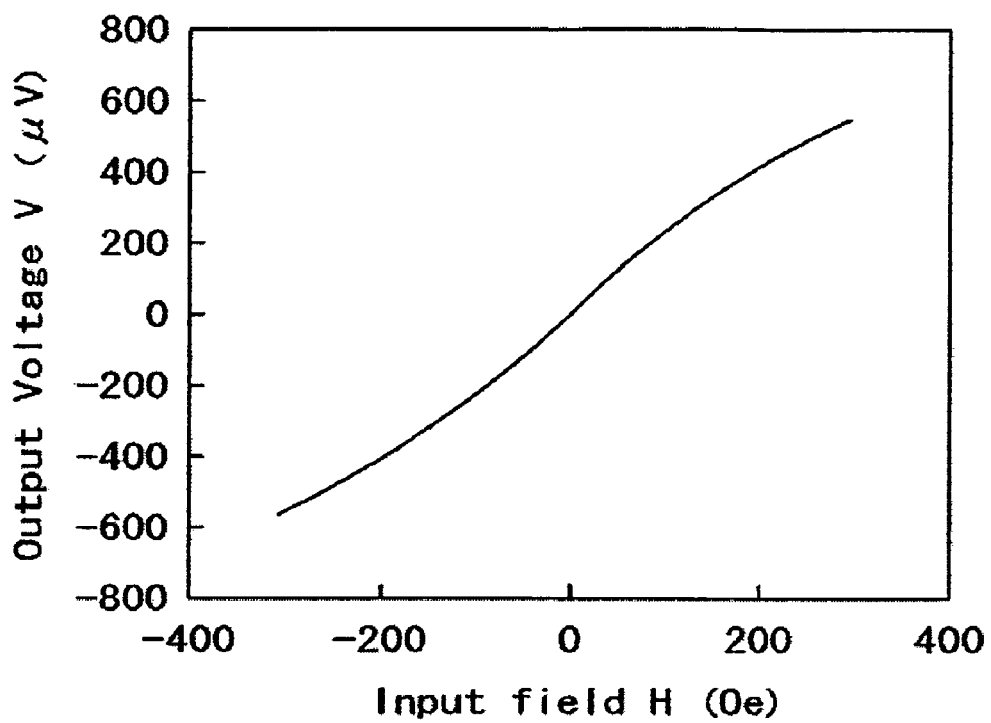
FIG. 5 is a graph illustrating as an example the experimental result of a transfer curve of a read head, the read track width of which is wide.
Figure 6:
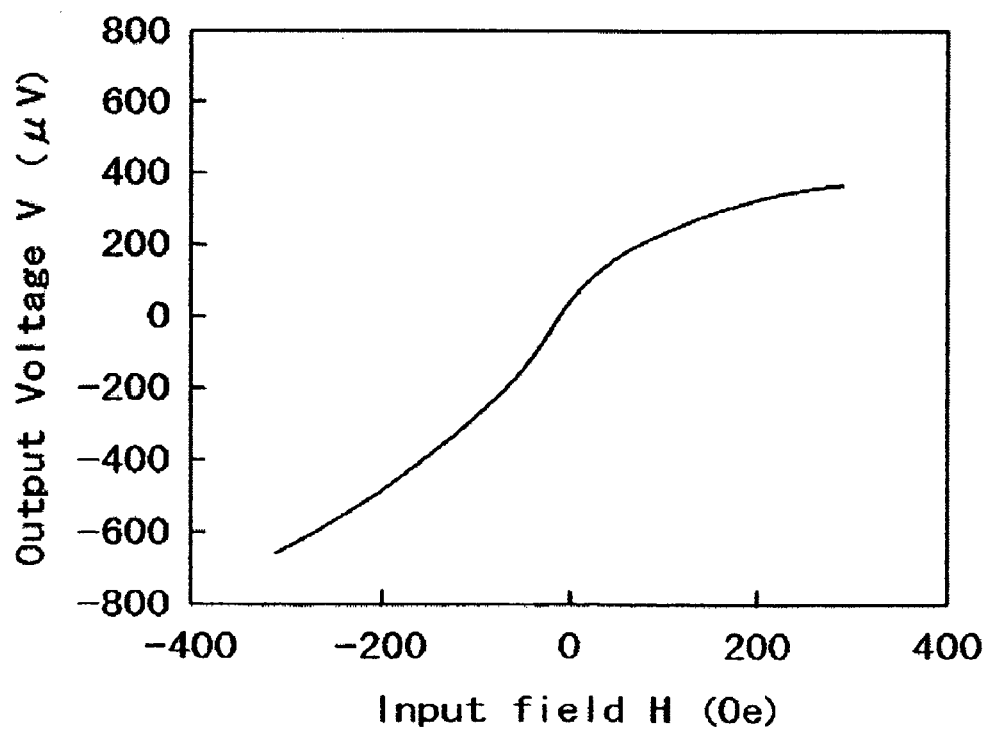
FIG. 6 is a graph illustrating as an example the experimental result of a transfer curve of a read head, the read track width of which is narrow.

FIG. 4 is a graph illustrating the result of an experiment in which a change in error rate was measured when the environmental temperature and a write current Iw were changed. While changing the temperature in a chamber of a read/write tester, an error rate was measured by use of a vertical perpendicular head. Judging from the result, it is found out that if the environmental temperature becomes lower, the error rate is certainly degraded at any value of the write current Iw. Here, FIGS. 5 and 6 are graphs each illustrating the measurement result of a transfer curve that shows the relationship between input/output responses of a read head. The transfer curve shows the relationship between an input (magnetic field) and an output (output voltage) of the read head. It is desirable that the transfer curve have a linear relation. FIG. 5 illustrates the experimental result of a transfer curve made by a wide head having a track width of about 200 nm. FIG. 6 illustrates the experimental result of a transfer curve made by a narrow head having a track width of about 60 nm.

Figure 7:
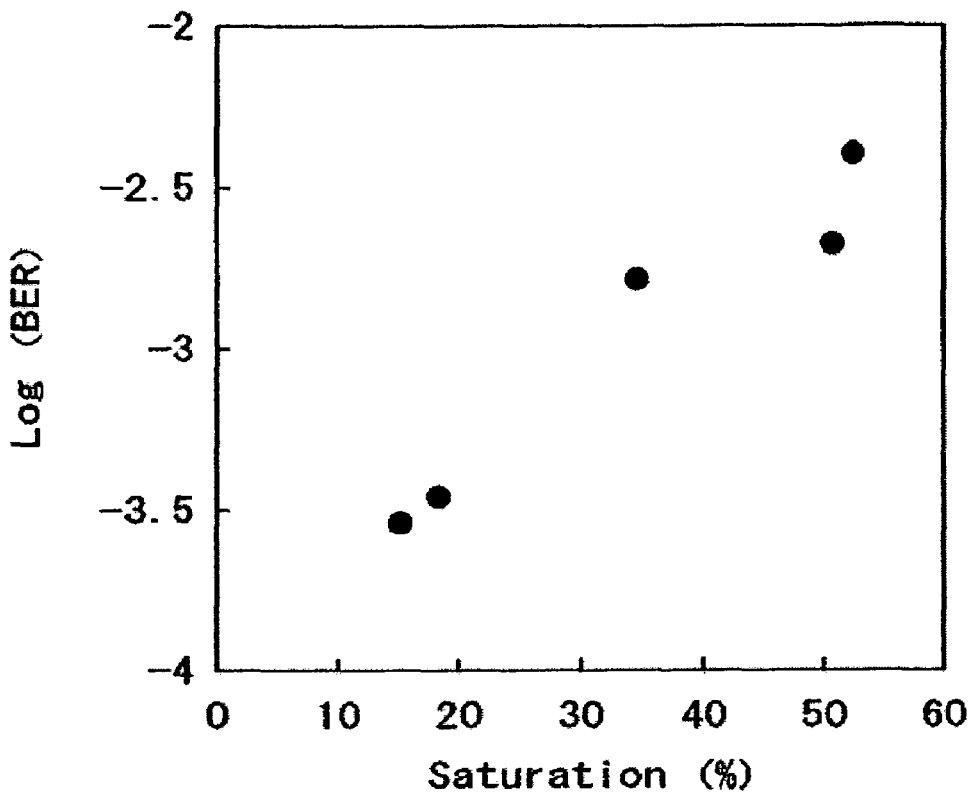
FIG. 7 is a graph illustrating as an example the correlation between a degree of saturation in the input/output relationship of a read head and an experimental value of an error rate.

As for the head, the track width of which is narrow, the output is saturated when an input magnetic field is large. Accordingly, it is understood that the output is not linear. Because increasing a sense current flowing through a read head means that the read head is used for read and write up to a point at which the transfer curve is saturated, it is not desirable from this point of view that the sense current be unreasonably increased. Here, FIG. 7 is a graph plotting, on the basis of several heads, the relationship between an experimental value of a measured error rate and a degree of saturation of the read head determined by the experiment. Judging from the figure, it is understood that the error rate (BER) is degraded with an increase in the degree of saturation.

Figure 8:
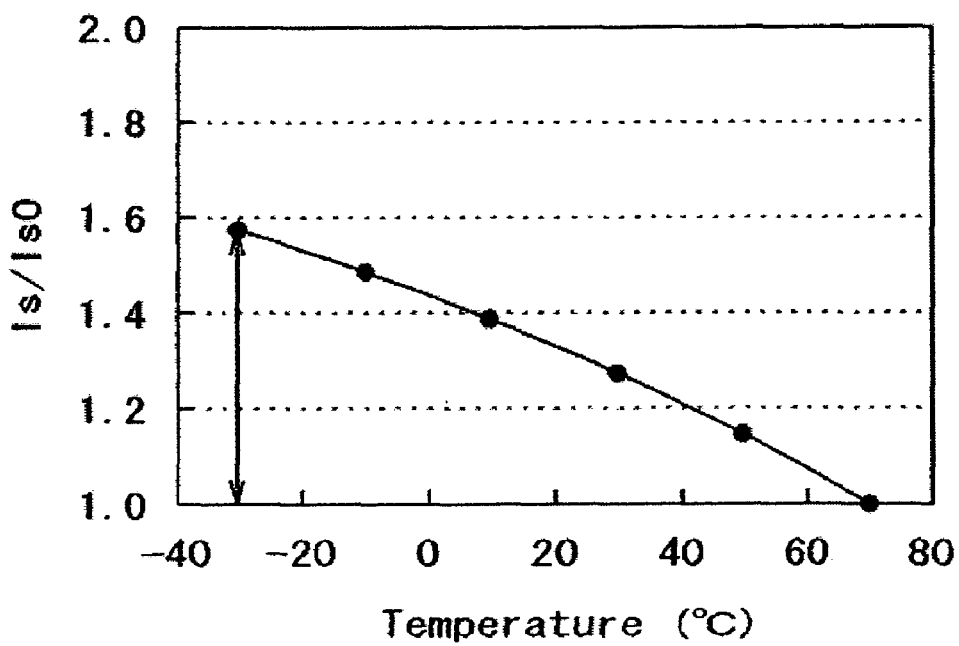
FIG. 8 is a graph illustrating an example in which permissible values of the sense current satisfying reliability conditions of a read head (the permissible values are standardized by a value at high temperature) are plotted relative to the environmental temperature of a magnetic disk drive.
Figure 9:
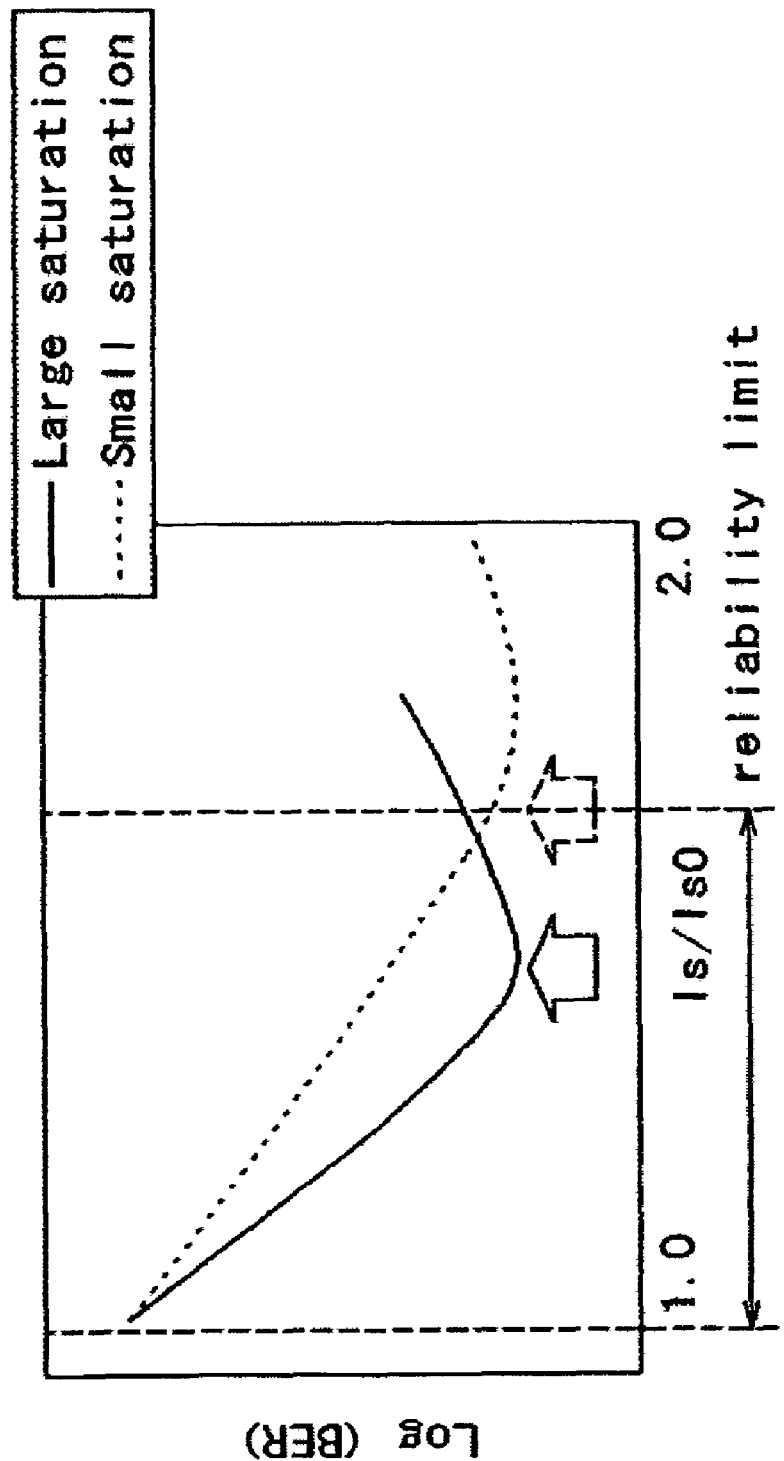
FIG. 9 is a graph illustrating, as an example, changes in error rate obtained when increasing a sense current of a head, a degree of output saturation of which is large, and a sense current of a head, a degree of output saturation of which is small.

FIG. 8 is a graph illustrating the maximum value of the sense current that satisfies the reliability of the read head corresponding to the environmental temperature, and that is standardized by a value Is0 at the time of a temperature of 70° C. For example, it is found out that at an environmental temperature of 30° C., the sense current is allowed to be increased by about 60%. Here, FIG. 9 is a graph illustrating a change in error rate of a read head, a degree of saturation of which is large, and a change in error rate of a read head, a degree of saturation of which is small, when changing the sense current within a range of this allowed Is (illustrated by an arrow). As for the head, a degree of saturation of which is small, the error rate tends to be improved with the increase in sense current. In other words, the upper limit from the viewpoint of the reliability is a point at which the optimum performance is achieved. However, as for the read head, a degree of saturation of which is large, the error rate is degraded in reverse around the upper limit of the sense current. Accordingly, the optimum sense current differs from the upper limit from the viewpoint of the reliability. Therefore, an optimum value exists. It is very difficult to make in advance a table of such an optimum value of the sense current on a head basis.

Figure 1:
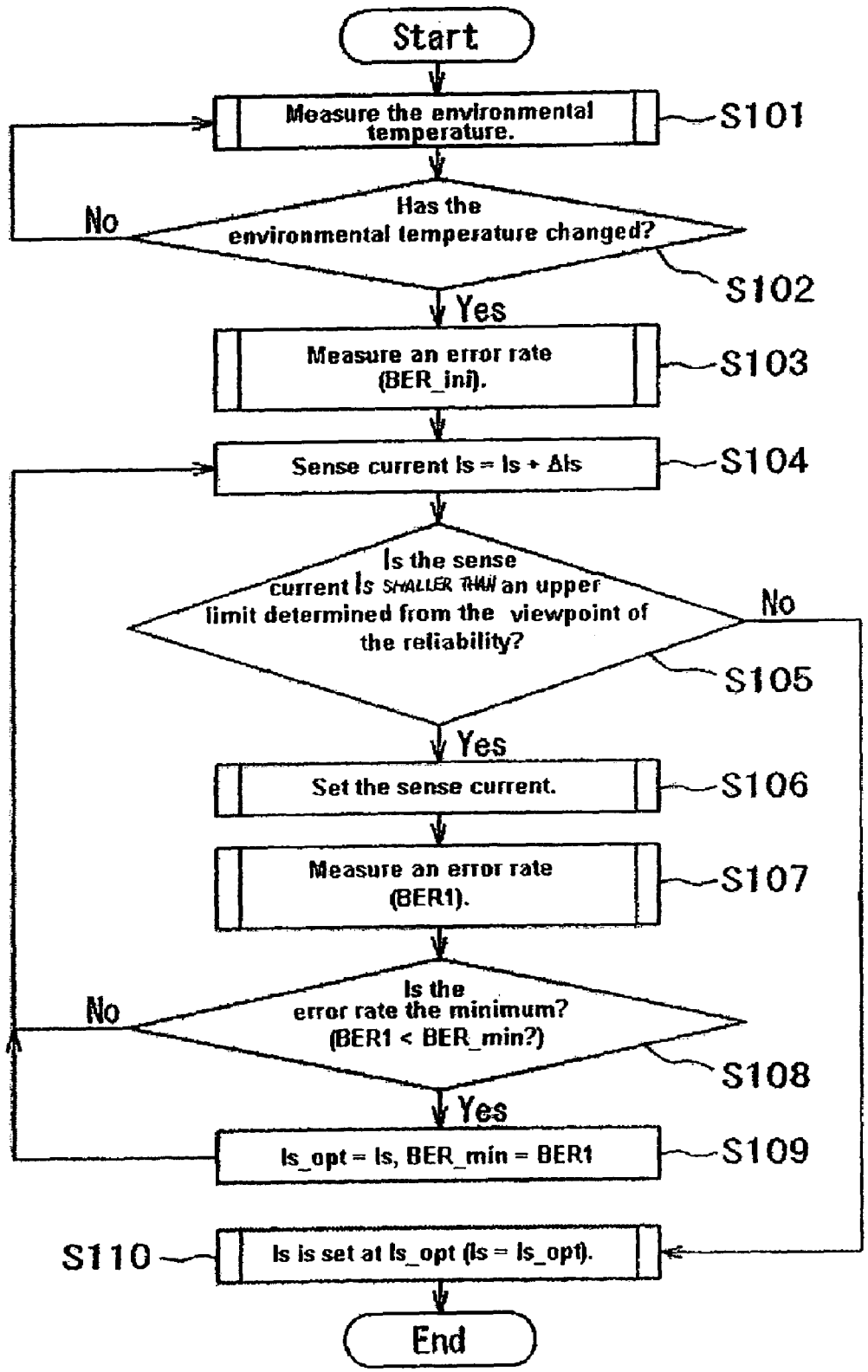
FIG. 1 is a flowchart illustrating how to find out an optimum sense current with a change in environmental temperature acting as a trigger according to a first embodiment of the present invention.

A first embodiment of the present invention will be described with reference to drawings as below. FIG. 1 is a flowchart illustrating a sequence of operation of a magnetic disk drive. To begin with, the environmental temperature is measured in the specific timing (S101). Here, the specific timing means, for example, when the power of the magnetic disk device is turned on, or when a magnetic head is loaded on a magnetic disk, or at specific time intervals. If there is no change in environmental temperature (S102) (in the case of No), nothing is performed, and subsequently the process returns to the measurement of the environmental temperature in the specific timing (S101). If a change in environmental temperature is detected (in the case of Yes), an error rate is measured, and then the result of the measurement is defined as an initial value of the error rate BER_ini (S103). Next, the sense current is increased only by ΔIs from the initial value Is (S104).

When actually setting a new sense current, it is indispensable to check whether or not the amount of this sense current is appropriate from the viewpoint of the reliability of the read head. Then, the maximum value of an electric current, which is determined from the viewpoint of the reliability at the environmental temperature stored in a magnetic disk or in a memory, is compared with a set value of a new sense current (S105). If the set value of the new sense current is smaller than a specified upper limit (in the case of Yes), the sense current is actually set (S106). After setting the sense current, an error rate is measured again to acquire a measured value BER1 (S107). This BER1 is compared with BER_min (S108). It is to be noted that BER_ini can be used as an initial value of the BER_min. If BER1 becomes smaller than BER_min (in the case of Yes), Is which is used at the time of the measurement is defined as an optimum value Is_opt of the sense current, and the error rate BER1 is substituted for BER_min (S109).

After that, the process returns again to the sense-current setting (S104). Then, a check is made as to whether or not the sense current can be increased from the current Is value only by $\Delta$Is (S105). If a new value of the sense current, which has been increased, is smaller than a specified upper limit, a series of processing steps are repeated. Here, the series of processing steps includes: setting a new sense current; and measuring an error rate. On the other hand, if the new sense-current value is larger than the specified upper limit (in the case of No), a value of Is_opt is set as a set value of the new sense current (S110) before ending the process.

Carrying out the above steps makes it possible to achieve the best error rate at the environmental temperature. In addition, it is possible to determine and set a sense current that satisfies reliability conditions. As a result, properties of the magnetic disk drive can be improved, and the magnetic disk drive can operate stably even under cold temperature environment.

Incidentally, in the embodiment described above, when setting the new sense current, this sense-current value is set so that the sense-current value does not exceed the maximum electric-current value which has been determined from the viewpoint of the reliability of the read head. However, how to set the new sense current is not limited to this method. The new sense current may also be set so that the sense-current value does not exceed the maximum electric-current value which has been determined from the viewpoint of the life of the read head. In another case, the new sense current may also be set so that the sense-current value does not exceed both the maximum electric-current value determined from the viewpoint of the reliability of the read head and the maximum electric-current value determined from the viewpoint of the life of the read head.

Figure 2:
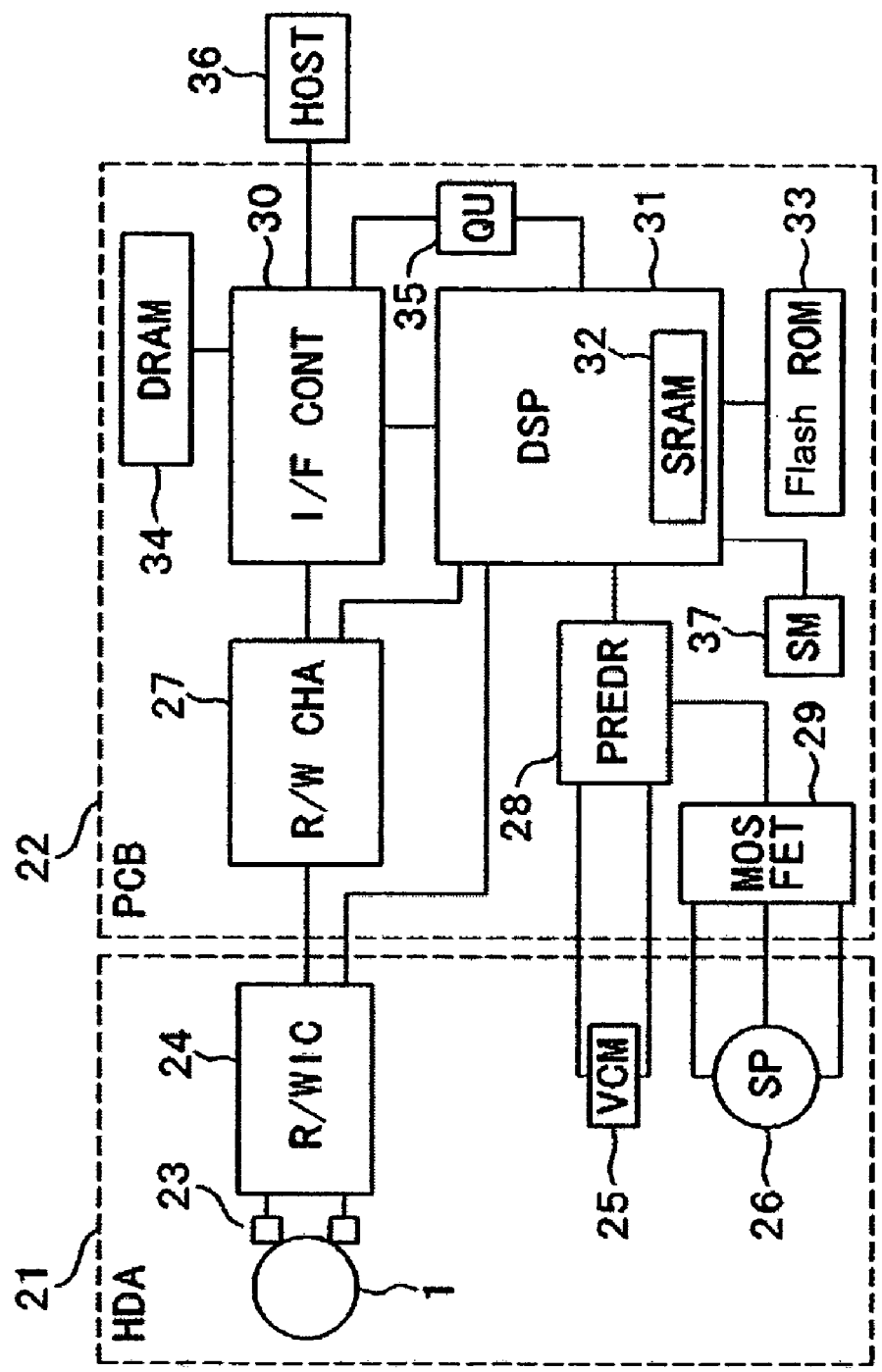
FIG. 2 is a block configuration diagram illustrating a magnetic disk drive to which embodiments of the present invention are applied.

FIG. 2 is a block configuration diagram illustrating a magnetic disk drive to which the first embodiment is applied. The magnetic disk drive comprises a head disk assembly (HDA) 21 and a circuit board 22. The HDA 21 comprises: a magnetic head 23; a read/write IC (R/W IC) 24 that is connected to the magnetic head 23; a magnetic disk 1; a spindle motor (SP) 26 for rotating the magnetic disk 1; and a voice coil motor (VCM) 25 for positioning the head. The spindle motor 26 is controlled by a field-effect transistor (MOS FET) 29 and a predriver (PREDR) 28. The VCM 25 is also controlled by the predriver 28 in like manner. In the meantime, the R/W IC 24 exchanges data with a read/write channel (R/W CHA) 27.

A magnetic disk drive control program, or control programs such as the SMART function, is saved in a Flash ROM 33 or the magnetic disk 1. As far as programs requiring high-speed operation are concerned, at the time of starting, these programs are temporarily saved in a SRAM 32 included in a digital signal processor (DSP) 31, which is a main control unit, before the programs are used. The magnetic disk drive exchanges user data with a host computer (HOST) 36 through an interface controller (I/F CONT) 30, for example, SCSI, FCAL, ATA, or the like. At this time, a DRAM 34 is used as a buffer. The DSP 31 synthetically controls a positioning system, a read/write system, and an interface system. On a substrate part 22, there is a temperature sensor such as a thermistor (SM) 37 for measuring the environmental temperature of the magnetic head 23. The thermistor 37 is capable of measuring a change in temperature by a change in resistance.

An error rate measurement program, table data including an upper limit of a sense current obtained from the viewpoint of the reliability, and the like, can be stored in the Flash ROM 33 or the magnetic disk 1. In addition, measured data and set values, including BER1, BER_ini, and Is_opt, which have been obtained when measuring an error rate in the drive, are temporarily stored in the SRAM 32 included in the DSP 31 before they are used. It is to be noted that the interface controller 30, for example, SCSI, FCAL, ATA, or the like, may also be included in the HDC I/F existing in the DSP 31. Moreover, the functions of the DRAM 34, the Flash ROM 33, the read/write channel 27, and the thermistor 37, may also be included in the DSP 31. A crystal oscillator (QU) 35 outputs an operation clock to the DSP 31 and the I/F controller 30.

Figure 3:
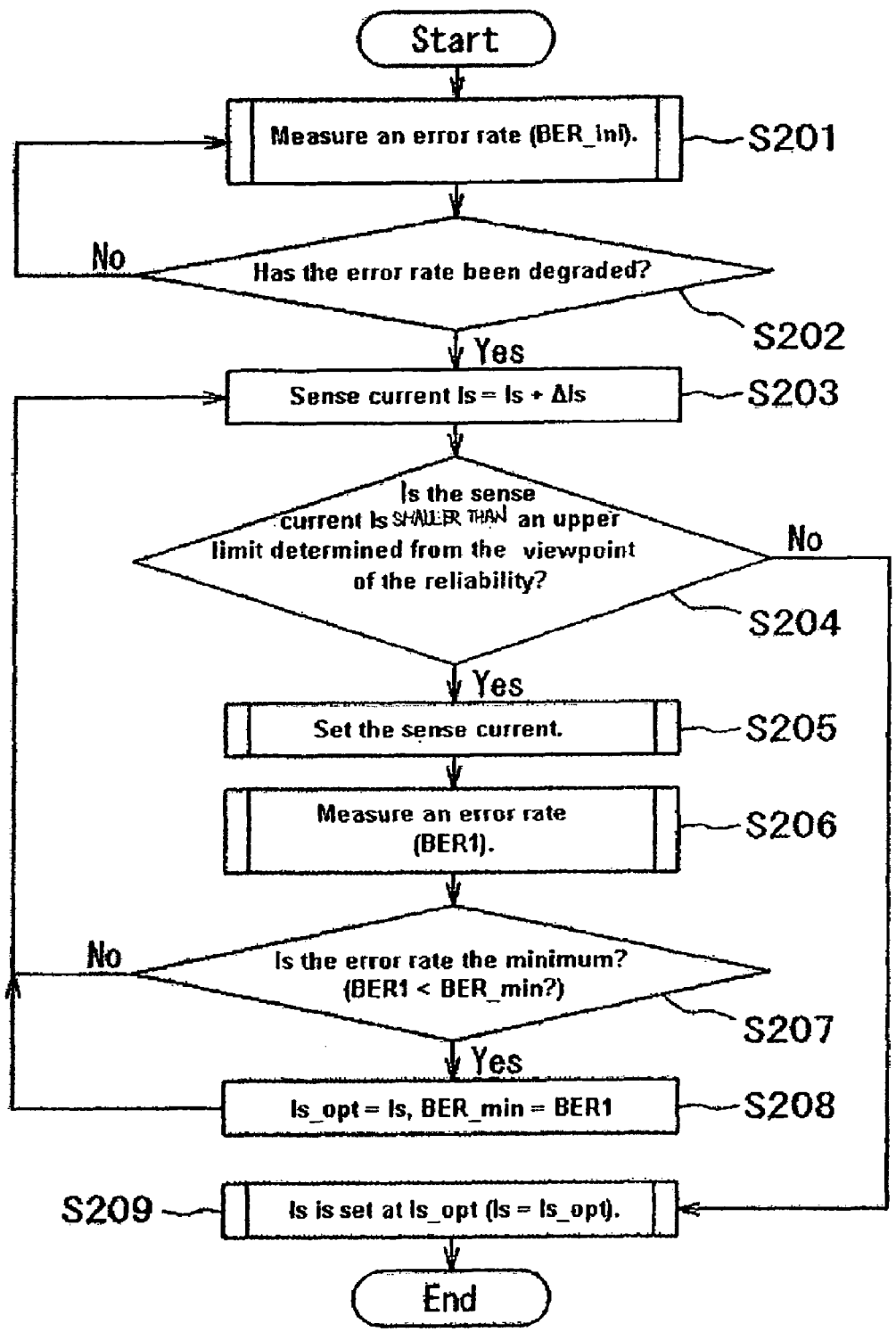
FIG. 3 is a flowchart illustrating how to find out an optimum sense current with the degradation in error rate acting as a trigger according to a second embodiment.

FIG. 3 is a flowchart illustrating a sequence of operation of a magnetic disk drive according to a second embodiment of the present invention. To begin with, an error rate is measured in the specific timing, and the result of the measurement is defined as BER_ini (S201). Here, the specific timing can be arbitrarily specified by a user. A check is made as to whether or not an error rate has been degraded (S202). If there is no change in error rate (in the case of No), nothing is performed, and the process returns to the measurement of an error rate in the specific timing (S201). If a change in error rate is detected (in the case of Yes), the sense current is increased only by $\Delta$Is from the initial value Is (S203). When actually setting a new sense current, it is indispensable to check whether or not the amount of this sense current is appropriate from the viewpoint of the reliability of the read head.

Then, the maximum value of an electric current, which is determined from the viewpoint of the reliability of the environmental temperature stored in the magnetic disk or in the memory, is compared with a set value of the new sense current (S204). If the set value of the new sense current is smaller than a specified upper limit (in the case of Yes), the sense current is actually set (S205). After setting the sense current, an error rate is measured again to acquire a measured value BER1 (S206). This BER1 is compared with BER_min (S207). It is to be noted that BER_ini can be used as an initial value of the BER_min. If BER1 becomes smaller than BER_min (in the case of Yes), Is which is used at the time of the measurement is defined as an optimum value Is_opt of the sense current, and BER1 is substituted for BER_min (S208).

After that, the process returns again to the sense-current setting (S203). Then, a check is made as to whether or not the sense current can be increased from the current Is value only by $\Delta$Is (S204). If a new value of the sense current, which has been increased, is smaller than a specified upper limit, a series of processing steps are repeated. Here, the series of processing steps includes: setting a new sense current; and measuring an error rate. On the other hand, if the new sense-current value is larger than the specified upper limit (in the case of No), a value of Is_opt is set as a set value of the new sense current (S209) before ending the process.

Carrying out the above steps makes it possible to minimize the influence of the degradation in error rate caused by the change with time, and the like. In addition, it is possible to determine and set a sense current that satisfies reliability conditions. As a result, it is possible to improve properties of the magnetic disk drive.

As is the case with the first embodiment, the magnetic disk drive to which the second embodiment is applied is the magnetic disk drive as shown in FIG. 2. Incidentally, also in the second embodiment, when setting the new sense current, this sense-current value is set so that the sense-current value does not exceed the maximum electric-current value which has been determined from the viewpoint of the reliability of the read head. However, how to set the new sense current is not limited to this method. The new sense current may also be set so that the sense-current value does not exceed the maximum electric-current value which has been determined from the viewpoint of the life of the read head. In another case, the new sense current may also be set so that the sense-current value does not exceed both the maximum electric-current value determined from the viewpoint of the reliability of the read head and the maximum electric-current value determined from the viewpoint of the life of the read head.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
a magnetic disk for storing data;
a magnetic head including a magnetoresistive effect element, said magnetic head at least reading data on the magnetic disk;
a temperature sensor configured to detect the environmental temperature of the magnetic head; and
a control unit configured to measure an error rate from a read signal of the magnetic head, and to receive an upper limit of the sense current;
wherein said control unit detects a change in environmental temperature from an output of the temperature sensor, and determines a sense current of the magnetoresistive effect element that the best error rate can be achieved while remaining below the upper limit of the sense current, and then sets the sense current below the upper limit;
wherein the upper limit of the sense current is a value that is determined from the viewpoint of the reliability of the magnetoresistive effect element
wherein:
when an increase in environmental temperature is detected, said control unit determines said sense current by repeatedly performing:
measuring an error rate at the environmental temperature in question, said error rate being defined as an initial value;
increasing the sense current by a specified value;
making a check as to whether or not said increased sense current has exceeded the upper limit that is determined from the viewpoint of the reliability of the magnetoresistive effect element;
if it is judged that the increased sense current has not exceeded the upper limit, setting the increased sense current as a new sense current;
measuring an error rate for the new sense current;
comparing the error rate for the new sense current with the error rate defined as the initial value; and
if the error rate for the new sense current is smaller than the error rate defined as the initial value, setting the new sense current as an optimum value, and defining the error rate for the new current as the initial value.

2. A magnetic disk drive according to claim 1, wherein:
the timing of detecting the change in environmental temperature is at the time of powering on.

3. A magnetic disk drive according to claim 1, wherein:
the timing of detecting the change in environmental temperature is at the time of loading the magnetic head.

4. A magnetic disk drive according to claim 1, wherein:
the timing of detecting the change in environmental temperature is at specific time intervals.

5. A magnetic disk drive comprising:
a magnetic disk for storing data;
a magnetic head including a magnetoresistive effect element, said magnetic head at least reading data on the magnetic disk;
a temperature sensor configured to detect the environmental temperature of the magnetic head; and
a control unit configured to measure an error rate from a read signal of the magnetic head, and to receive an upper limit of the sense current;
wherein said control unit detects a change in environmental temperature from an output of the temperature sensor, and determines a sense current of the magnetoresistive effect element that the best error rate can be achieved while remaining below the upper limit of the sense current, and then sets the sense current below the upper limit;
wherein the upper limit of the sense current is a value that is determined from the viewpoint of the life of the magnetoresistive effect element;
wherein:
when an increase in environmental temperature is detected, said control unit determines said sense current by repeatedly performing:
measuring an error rate at the environmental temperature in question, said error rate being defined as an initial value;
increasing the sense current by a specified value;
making a check as to whether or not said increased sense current has exceeded the upper limit that is determined from the viewpoint of the life of the magnetoresistive effect element;
if it is judged that the increased sense current has not exceeded the upper limit, setting the increased sense current as a new sense current;
measuring an error rate for the new sense current;
comparing the error rate for the new sense current with the error rate defined as the initial value; and
if the error rate for the new sense current is smaller than the error rate defined as the initial value, setting the new sense current as an optimum value, and defining the error rate for the new current as the initial value.

6. A magnetic disk drive according to claim 5, wherein:
the timing of detecting the change in environmental temperature is at the time of powering on.

7. A magnetic disk drive according to claim 5, wherein:
the timing of detecting the change in environmental temperature is at the time of loading the magnetic head.

8. A magnetic disk drive according to claim 5, wherein:
the timing of detecting the change in environmental temperature is at specific time intervals.

9. A magnetic disk drive comprising:
a magnetic disk for storing data;
a magnetic head including a magnetoresistive effect element, said magnetic head at least reading data on the magnetic disk;

a temperature sensor configured to detect the environmental temperature of the magnetic head; and a control unit configured to measure an error rate from a read signal of the magnetic head, and to receive an upper limit of the sense current;

wherein said control unit detects a change in environmental temperature from an output of the temperature sensor, and determines a sense current of the magnetoresistive effect element that the best error rate can be achieved while remaining below the upper limit of the sense current, and then sets the sense current below the upper limit;

wherein the upper limit of the sense current is a value that is determined from the viewpoint of the reliability of the magnetoresistive effect element and from the viewpoint of the life of the magnetoresistive effect element wherein:

when an increase in environmental temperature is detected, said control unit determines said sense current by repeatedly performing:

measuring an error rate at the environmental temperature in question, said error rate being defined as an initial value;

increasing the sense current by a specified value;

making a check as to whether or not said increased sense current has exceeded the upper limit that is determined from the viewpoint of the reliability of the magnetoresistive effect element and from the viewpoint of the life of the magnetoresistive effect element;

if it is judged that the increased sense current has not exceeded the upper limit, setting the increased sense current as a new sense current;

measuring an error rate for the new sense current;

comparing the error rate for the new sense current with the error rate defined as the initial value; and if the error rate for the new sense current is smaller than the error rate defined as the initial value, setting the new sense current as an optimum value, and defining the error rate for the new current as the initial value.

10. A magnetic disk drive according to claim 9, wherein:

the timing of detecting the change in environmental temperature is at the time of powering on.

11. A magnetic disk drive according to claim 9, wherein:

the timing of detecting the change in environmental temperature is at the time of loading the magnetic head.

12. A magnetic disk drive according to claim 9, wherein:

the timing of detecting the change in environmental temperature is at specific time intervals.

\* \* \* \* \*